United States Patent
Wan et al.

(10) Patent No.: US 8,792,202 B1
(45) Date of Patent: Jul. 29, 2014

(54) DISK DRIVE ADJUSTING ROTATION SPEED OF DISK TO COMPENSATE FOR BLIND AREA WHEN MEASURING FREQUENCY RESPONSE OF SERVO CONTROL SYSTEM

(71) Applicant: Western Digital Technologies, Inc., Irvine, CA (US)

(72) Inventors: Jie Wan, Singapore (SG); Xiaotian Xu, Singapore (SG); Shuyu Cao, Singapore (SG); Jern Khang Tan, Muar (MY); Guoxiao Guo, Irvine, CA (US); Wei Xi, Mission Viejo, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 14/014,267

(22) Filed: Aug. 29, 2013

(51) Int. Cl.
*G11B 5/596* (2006.01)
*G11B 20/20* (2006.01)

(52) U.S. Cl.
USPC ..................................... 360/77.08; 369/47.28

(58) Field of Classification Search
USPC ......... 360/77.07, 77.08, 75, 77.05, 69, 73.03, 360/77.04, 73.08; 369/47.1, 47.36, 47.26, 369/47.28
See application file for complete search history.

(56) References Cited

U.S. PATENT DOCUMENTS

| | | |
|---|---|---|
| 5,654,841 A | 8/1997 | Hobson et al. |
| 6,606,213 B1 | 8/2003 | Ooi et al. |
| 6,643,080 B1 | 11/2003 | Goodner, III et al. |
| 7,433,145 B2 * | 10/2008 | Yada et al. ............... 360/69 |
| 7,660,701 B2 | 2/2010 | Sharpe, Jr. |

OTHER PUBLICATIONS

Rick Ehrlich, Carl Taussig, Daniel Abramovitch, "Identification of Sampled Data Systems at Frequencies Beyond the Nyquist Rate," In the Proceedings of the 1989 IEEE Conference on Decision and Control in Tampa, FL, Dec. 1989.

* cited by examiner

*Primary Examiner* — Nabil Hindi

(57) ABSTRACT

A disk drive is disclosed comprising a head and a disk comprising a plurality of servo tracks, wherein each servo track comprises a plurality of servo sectors. The disk drive further comprises control circuitry comprising a servo control system operable to actuate the head over the disk in response to the servo sectors. The disk is rotated at a first speed and the servo sectors are read at a first servo sample frequency to generate first servo samples. The disk is rotated at a second speed different from the first speed and the servo sectors are read at a second servo sample frequency to generate second servo samples. The second servo samples are processed to measure a frequency response of the servo control system proximate the first servo sample frequency.

30 Claims, 5 Drawing Sheets

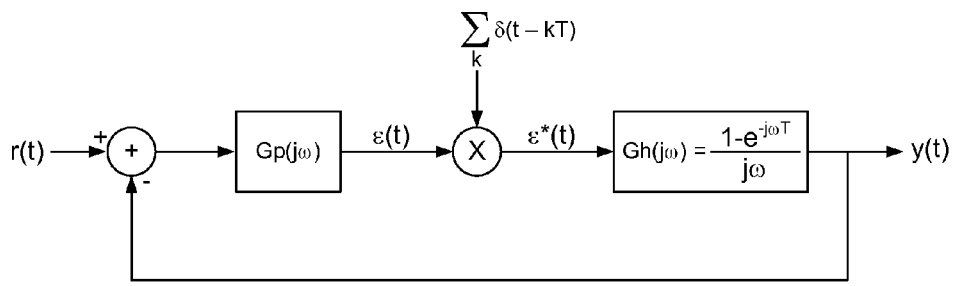

FIG. 4A $$Y(j\omega) = Gh(j\omega)E^*(j\omega)$$

$$E^*(j\omega) = \frac{[Gp(j\omega)R(j\omega)]^*}{1 + [Gp(j\omega)Gh(j\omega)]^*}$$

$$Y(j\omega) = \frac{Gh(j\omega)[Gp(j\omega)R(j\omega)]^*}{1 + [Gp(j\omega)Gh(j\omega)]^*}$$

$$H_{eff}(j\omega) = \frac{Y_0}{R_0} = \frac{Gp(j\omega)R(j\omega)}{1 + [Gp(j\omega)Gh(j\omega)]^*} \cdot \frac{1}{T}$$

$$H_\Sigma(j\omega) = \sum_k H_{eff}(j[\omega - k\omega_s]) = \frac{[Gp(j\omega)Gh(j\omega)]^*}{1 + [Gp(j\omega)Gh(j\omega)]^*}$$

$$Gp(j\omega)Gh(j\omega) \cdot \frac{1}{T} = \frac{H_{eff}(j\omega)}{1 - H_\Sigma(j\omega)}$$

FIG. 4B

DISK DRIVE ADJUSTING ROTATION SPEED OF DISK TO COMPENSATE FOR BLIND AREA WHEN MEASURING FREQUENCY RESPONSE OF SERVO CONTROL SYSTEM

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

FIG. 1 shows a prior art disk format 2 as comprising a number of servo tracks 4 defined by servo sectors $6_0$-$6_N$ recorded around the circumference of each servo track. Each servo sector 6, comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector 6, further comprises groups of servo bursts 14 (e.g., N and Q servo bursts), which are recorded with a predetermined phase relative to one another and relative to the servo track centerlines. The phase based servo bursts 14 provide fine head position information used for centerline tracking while accessing a data track during write/read operations. A position error signal (PES) is generated by reading the servo bursts 14, wherein the PES represents a measured position of the head relative to a centerline of a target servo track. A servo controller processes the PES to generate a control signal applied to a head actuator (e.g., a voice coil motor) in order to actuate the head radially over the disk in a direction that reduces the PES.

BRIEF DESCRIPTION OF THE DRAWINGS

FIG. 4A represents a closed-loop sampled servo control system according to an embodiment.

FIG. 4B illustrates an embodiment for deriving the effective transfer function of the closed-loop sampled servo control system.

DETAILED DESCRIPTION

Figure 1:
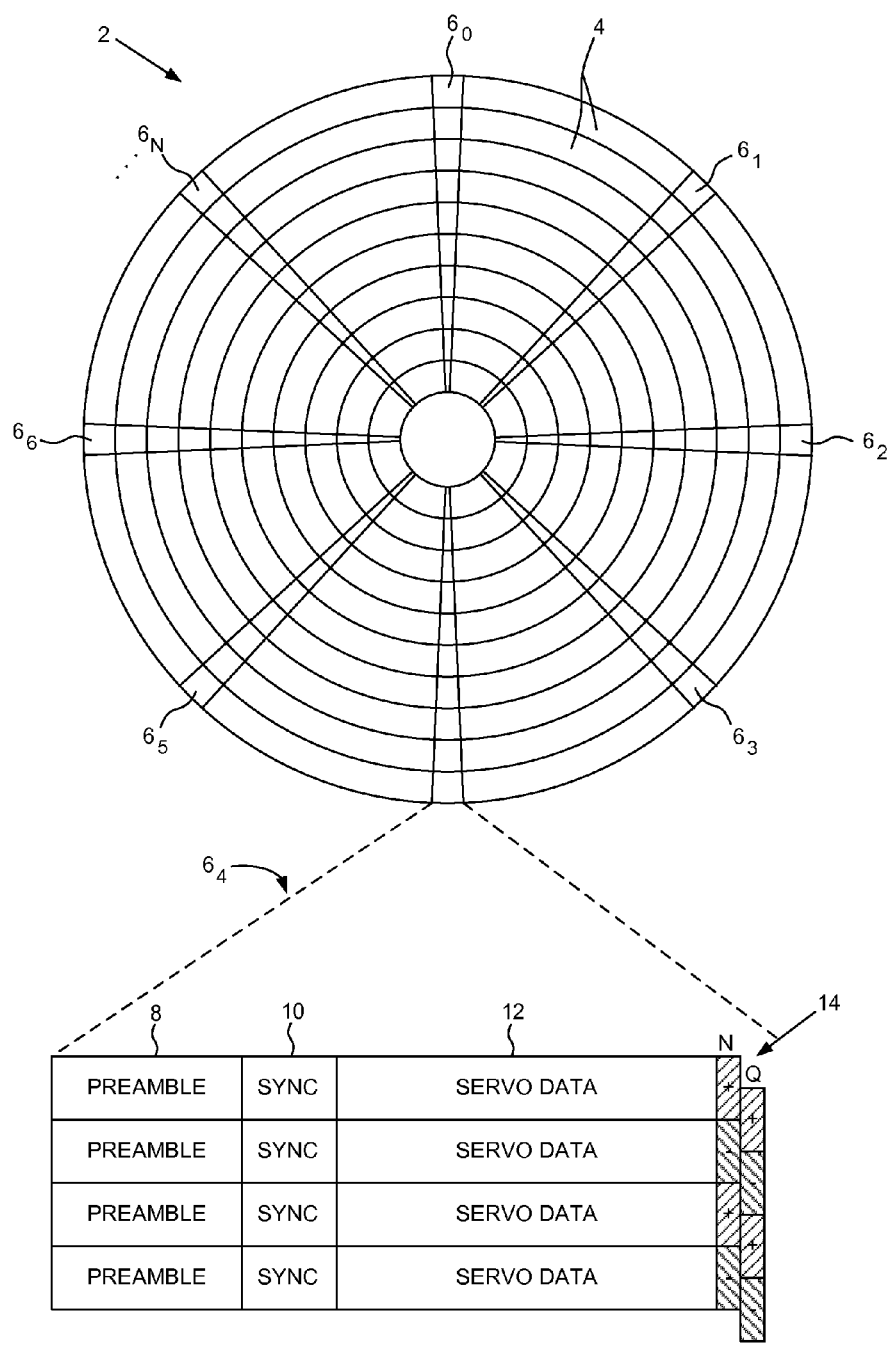
FIG. 1 shows a prior art disk format comprising a plurality of servo tracks defined by servo sectors.
Figure 2:
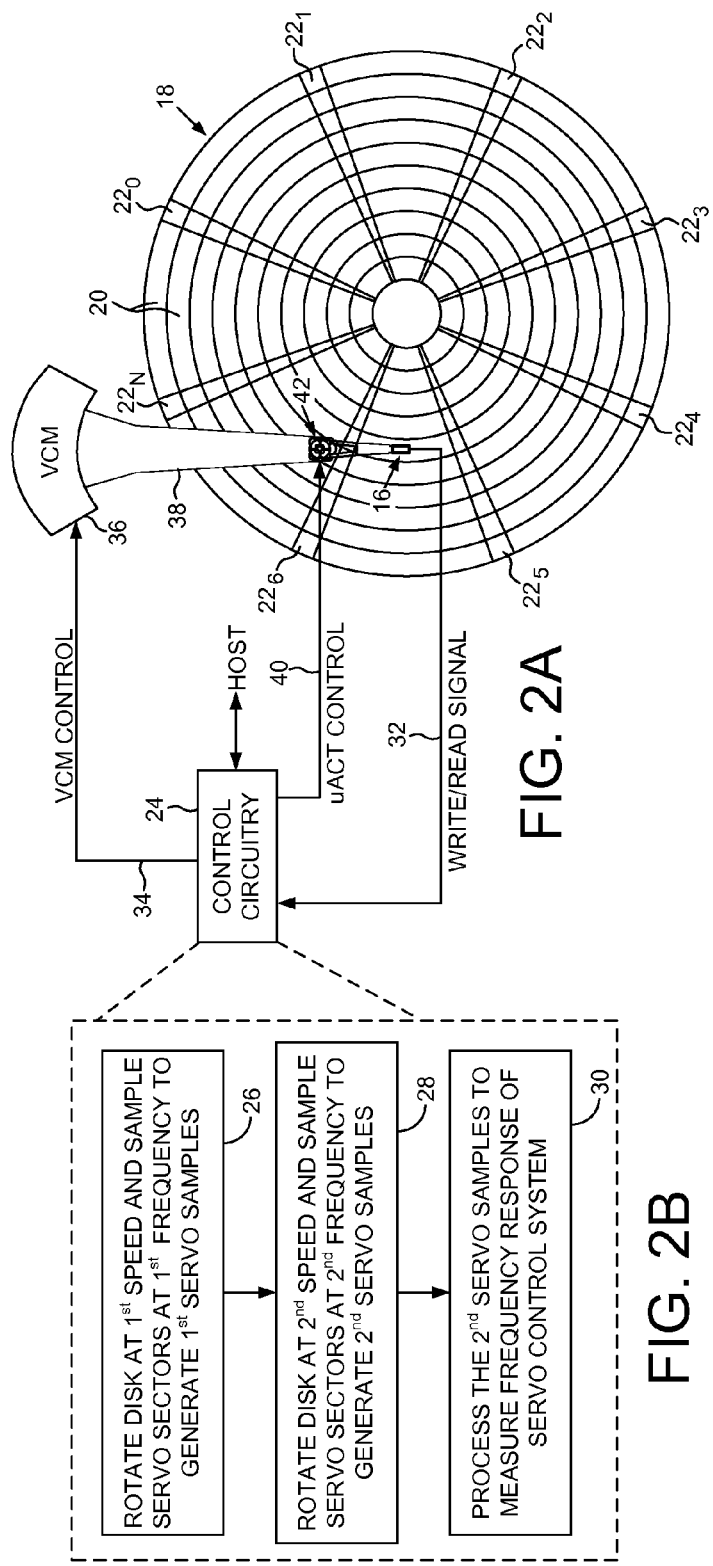
FIG. 2A shows a disk drive according to an embodiment comprising a head actuated over a disk by a servo control system.
FIG. 2B is a flow diagram according to an embodiment wherein a rotation speed of the disk is adjusted from a first speed to a second speed in order to measure a frequency response of the servo control system proximate a servo sample rate corresponding to the first speed.

FIG. 2A shows a disk drive according to an embodiment comprising a head 16 and a disk 18 comprising a plurality of servo tracks 20, wherein each servo track comprises a plurality of servo sectors $22_0$-$22_N$. The disk drive further comprises control circuitry 24 comprising a servo control system operable to actuate the head over the disk in response to the servo sectors $22_0$-$22_N$, the control circuitry 24 operable to execute the flow diagram of FIG. 2B. The disk is rotated at a first speed and the servo sectors are read at a first servo sample frequency to generate first servo samples (block 26). The disk is rotated at a second speed different from the first speed and the servo sectors are read at a second servo sample frequency to generate second servo samples (block 28). The second servo samples are processed to measure a frequency response of the servo control system proximate the first servo sample frequency (block 30).

In the embodiment of FIG. 2A, the control circuitry 24 processes a read signal 32 emanating from the head 16 to demodulate the servo sectors $22_0$-$22_N$ and generate a position error signal (PES) representing an error between the actual position of the head and a target position relative to a target track. In one embodiment, the target track comprises a target data track defined relative to the servo tracks 20, wherein the data tracks may be recorded at the same or different radial density than the servo tracks 20. The control circuitry 24 filters the PES using a suitable compensation filter to generate a control signal 34 applied to a voice coil motor (VCM) 36 which rotates an actuator arm 38 about a pivot in order to actuate the head 16 radially over the disk 18 in a direction that reduces the PES. The control circuitry 24 may also generate a control signal 40 applied to a microactuator 42 in order to actuate the head 16 over the disk 18 in fine movements. Any suitable microactuator 42 may be employed in the embodiments, such as a piezoelectric actuator. In addition, the microactuator 42 may actuate the head 16 over the disk 18 in any suitable manner, such as by actuating a suspension relative to the actuator arm, or actuating a slider relative to the suspension. The servo sectors $22_0$-$22_N$ may comprise any suitable head position information, such as a track address for coarse positioning and servo bursts for fine positioning. The servo bursts may comprise any suitable pattern, such as an amplitude based servo pattern or a phase based servo pattern.

In one embodiment, it may be desirable to measure a frequency response of the servo control system for actuating the head 16 over the disk 18 in order, for example, to identify resonant frequencies of the servo system. In one embodiment, the servo control system may be modified based on the identified resonant frequencies, such as by adding and/or modifying notch filters that attenuate the frequency response at the resonant frequencies. In another embodiment, the identified resonant frequencies may be used to identify defective servo components, such as a defective VCM 36 or microactuator 42, so that the disk drive may be discarded or reworked to replace the defective components.

Figure 3:
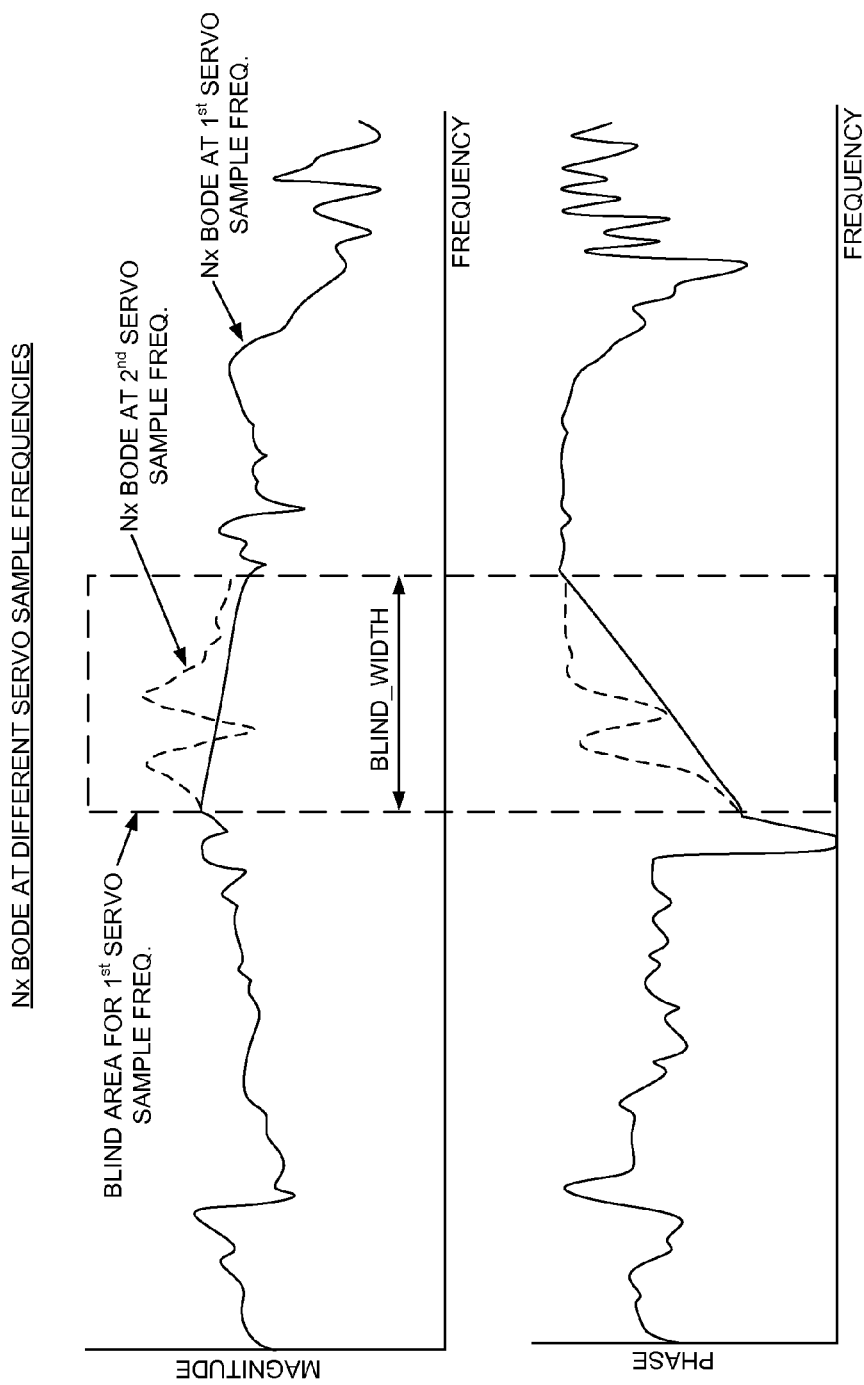
FIG. 3 illustrates an embodiment wherein a measured frequency response of the servo control system while rotating the disk at a first speed exhibits a blind area near the servo sample rate which may be accounted for by adjusting the disk rotation speed from the first speed to the second speed.

In one embodiment, the technique for measuring the frequency response of the servo control system may exhibit a blind area proximate the servo sampling frequency (where the servo sampling frequency is based on the rotation speed of the disk). For example, when the disk 18 is rotated at a normal operating speed used to access the data tracks (write/read operations), the control circuitry 24 reads the servo sectors at a corresponding servo sample frequency to generate servo samples. The control circuitry 24 may then measure the frequency response of the servo control system based on the servo samples (e.g., the PES generated at each servo sector). An example frequency response measured for the servo control system is shown in FIG. 3, which includes a magnitude response and a phase response. When the disk is rotated at a first rotation speed (e.g., the operating rotation speed used to access the disk during normal operations), there may be a blind area in the measured frequency response (solid line response) shown in FIG. 3, where the blind area corresponds to a frequency range proximate the servo sampling frequency. Accordingly, in order to measure the frequency response across the blind area, in one embodiment the rotation speed of the disk is adjusted (increased or decreased) which effectively shifts the blind area in the measured frequency response. In one embodiment, the frequency response is measured over a desired range of frequencies outside the blind area while the disk is rotating at the first speed (e.g., operating speed), and then the frequency response is measured for the blind area after adjusting the rotation speed of the disk.

In one embodiment, the technique for measuring the frequency response of the servo control system may exhibit multiple blind areas, such as at an integer multiple of the servo sample frequency. Accordingly, in one embodiment after adjusting the rotation speed of the disk from the first speed to the second speed, the frequency response of the servo control system may be measured proximate an integer multiple of the first servo sample frequency.

In one embodiment, the degree to which the control circuitry 24 adjusts the rotation speed of the disk 18 depends on the width of the blind area shown in FIG. 3. That is, as the rotation speed of the disk 18 is increased or decreased, there is a corresponding change in the servo sample frequency, and a corresponding shift of the blind area in the frequency response of the servo control system. In one embodiment, the control circuitry is operable to adjust (increase or decrease) the rotation speed of the disk to the second speed so that:

$Fs\_new > Fs + BLIND\_WIDTH$ or $Fs\_new < Fs - BLIND\_WIDTH$ where Fs represents the first servo sample frequency when the disk is rotated at the first speed, and Fs_new represents the second servo sample frequency when the disk is rotated at the second speed. In one embodiment, the width of the blind area (BLIND_WIDTH) in the frequency response requires an adjustment to the rotation speed of the disk of not more than ten percent of the first speed.

Any suitable technique may be employed to measure the frequency response of the servo control system. In one embodiment, the control circuitry processes the second servo samples to measure the frequency response of the servo control system proximate the first servo sample frequency using a signal processing algorithm capable of measuring the frequency response of the servo control system at frequencies higher than half the second servo sample frequency. Such a signal processing algorithm may include an anti-aliasing multi-rate (Nx) bode algorithm which is understood with reference to FIGS. 4A and 4B. FIG. 4A represents the closed-loop sampled servo control system wherein $G_p(j\omega)$ represents the plant under test (e.g., a compensator and actuator), r(t) represents a reference input, y(t) represents the sampled output (e.g., the PES measured at each servo sector), and $Gh(j\omega)$ represents a zero order hold function. In one embodiment, the frequency response of the closed-loop servo control system shown in FIG. 4A is measured at discrete frequencies (e.g., frequency $\omega_0$) by injecting a sinusoid having a frequency $\omega_0$ as the reference input $R(j\omega)$. The effective transfer function $Heff(j\omega)$ may be derived as shown in FIG. 4B where T represents the servo sample period. The term $H_\Sigma(j\omega)$ represents the discrete-time transfer function of the closed-loop system evaluated at $z=e^{j\omega T}$, and $\omega_s$ represents the servo sample frequency. Since the effective transfer function $Heff(j\omega)$ does not exhibit aliasing (anti-aliasing) it may be measured at any frequencies, including frequencies beyond half the servo sample frequency (the Nyquist frequency). However, when using the above-described multi-rate (Nx) bode algorithm, the frequency response is undefined when the frequency of the reference input $R(j\omega)$ is proximate an integer multiple of the servo sample frequency ($k\omega_s$) resulting in blind areas proximate an integer multiple of the servo sample frequency such as illustrated in FIG. 3.

In one embodiment, the above-described multi-rate (Nx) bode algorithm (or another algorithm) may be used to measure the frequency response of the servo control system over a desired range of frequencies outside the blind areas while the disk is rotating at the first speed (e.g., the operating speed). The control circuitry 24 may then adjust the rotation speed of the disk to the second speed in order to measure the frequency response of the servo control system over the blind areas that were not measured while the disk was rotating at the first speed.

Figure 5A:
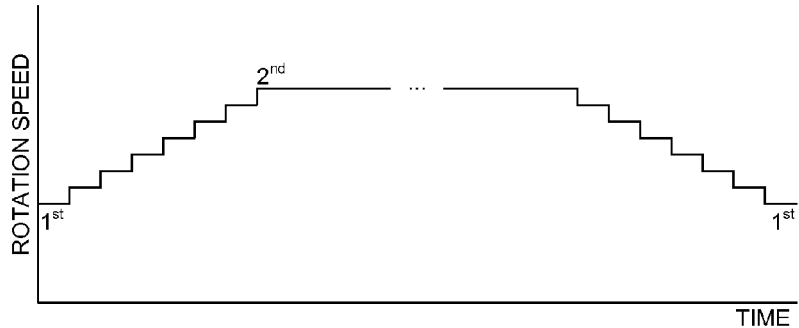
FIG. 5A shows an embodiment wherein the disk rotation speed is adjusted by incrementally increasing the rotation speed.

FIG. 5A shows an embodiment wherein the control circuitry 24 is operable to adjust the rotation speed of the disk (increase the rotation speed) from the first speed to the second speed in a number of step increments. For example, the control circuitry 24 may adjust the rotation speed higher and then lower in at least five step increments. This gradual adjustment to the rotation speed may help avoid airflow dynamics that may perturb the head causing contact with the disk, and/or help avoid undesirable actuator mechanical modes which may corrupt the frequency response measurement.

Figure 5B:
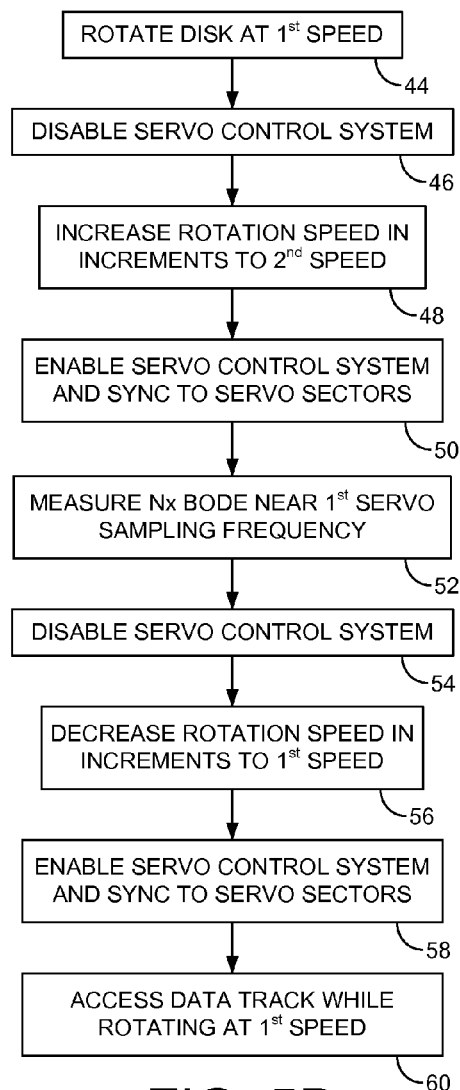
FIG. 5B is a flow diagram according to an embodiment wherein the rotation speed is incrementally increased from the first speed to the second speed, the frequency response is measured, and then the rotation speed is incrementally decreased from the second speed to the first speed.

FIG. 5B is a flow diagram according to an embodiment wherein the disk is rotated (block 44) at a first peed (e.g., the normal operating speed). The servo control system is then disabled (block 46) and the rotation speed of the disk is increased in increments to a second speed (block 48) as illustrated in FIG. 5A. The servo control system is enabled in order to synchronize to the servo sectors at the second servo sample frequency (block 50). While the disk is rotating at the second speed, a frequency response of the servo control system is measured (e.g., using the above-described multi-rate (Nx) bode algorithm) proximate the first servo sample frequency (block 52) based on the second servo samples taken at the second servo sample frequency. The servo control system is disabled (block 54) and the rotation speed of the disk is decreased in increments to the first speed (block 56). The servo control system is then enabled in order to synchronize to the servo sectors at the first servo sample frequency (block 58). In the embodiment of FIG. 5B, the first speed is the normal operating speed wherein a data track may be accessed during write/read operations (block 60).

Any suitable control circuitry may be employed to implement the flow diagrams in the above embodiments, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

The various features and processes described above may be used independently of one another, or may be combined in various ways. All possible combinations and subcombinations are intended to fall within the scope of this disclosure. In addition, certain method, event or process blocks may be omitted in some implementations. The methods and processes described herein are also not limited to any particular sequence, and the blocks or states relating thereto can be performed in other sequences that are appropriate. For example, described tasks or events may be performed in an order other than that specifically disclosed, or multiple may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the embodiments disclosed herein.

What is claimed is:

1. A disk drive comprising:
   a head;
   a disk comprising a plurality of servo tracks, wherein each servo track comprises a plurality of servo sectors; and
   control circuitry comprising a servo control system operable to actuate the head over the disk in response to the servo sectors, the control circuitry operable to:
   rotate the disk at a first speed and read the servo sectors at a first servo sample frequency to generate first servo samples;
   rotate the disk at a second speed different from the first speed and read the servo sectors at a second servo sample frequency to generate second servo samples; and
   process the second servo samples to measure a frequency response of the servo control system proximate the first servo sample frequency.

2. The disk drive as recited in claim 1, wherein the frequency response comprises a frequency response of an actuator operable to actuate the head over the disk.

3. The disk drive as recited in claim 2, wherein the actuator comprises a voice coil motor.

4. The disk drive as recited in claim 2, wherein the actuator comprises a microactuator.

5. The disk drive as recited in claim 1, wherein the control circuitry is further operable to process the second servo samples to measure a frequency response of the servo control system proximate an integer multiple of the first servo sample frequency.

6. The disk drive as recited in claim 1, wherein the control circuitry is further operable to:
   define data tracks relative to the servo tracks; and
   access one of the data tracks while the disk is rotating at the first speed.

7. The disk drive as recited in claim 1, wherein the second speed differs from the first speed by less than ten percent of the first speed.

8. The disk drive as recited in claim 1, wherein the second speed is less than the first speed.

9. The disk drive as recited in claim 1, wherein the second speed is greater than the first speed.

10. The disk drive as recited in claim 1, wherein the control circuitry is further operable to adjust a rotation speed of the disk from the first speed to the second speed in a number of step increments.

11. The disk drive as recited in claim 10, wherein the number of step increments is greater than five.

12. The disk drive as recited in claim 1, wherein the control circuitry is further operable to:
   disable the servo control system while adjusting the rotation speed of the disk from the first speed to the second speed; and
   after adjusting the rotation speed of the disk, enable the servo control system and synchronize to the servo sectors while the disk is rotating at the second speed.

13. The disk drive as recited in claim 1, wherein the control circuitry is further operable to process the second servo samples to measure the frequency response of the servo control system proximate the first servo sample frequency using a signal processing algorithm capable of measuring the frequency response of the servo control system at frequencies higher than half the second servo sample frequency.

14. The disk drive as recited in claim 13, wherein the signal processing algorithm comprises an anti-aliasing multi-rate bode algorithm.

15. The disk drive as recited in claim 13, wherein the signal processing algorithm results in a blind area in the frequency response proximate a servo sample frequency of the disk drive.

16. A method of operating a disk drive comprising:
   rotating a disk at a first speed and reading servo sectors on the disk at a first servo sample frequency to generate first servo samples;
   rotating the disk at a second speed different from the first speed and reading the servo sectors at a second servo sample frequency to generate second servo samples; and
   processing the second servo samples to measure a frequency response of a servo control system proximate the first servo sample frequency.

17. The method as recited in claim 16, wherein the frequency response comprises a frequency response of an actuator operable to actuate a head over the disk.

18. The method as recited in claim 17, wherein the actuator comprises a voice coil motor.

19. The method as recited in claim 17, wherein the actuator comprises a microactuator.

20. The method as recited in claim 16, further comprising processing the second servo samples to measure a frequency response of the servo control system proximate an integer multiple of the first servo sample frequency.

21. The method as recited in claim 16, further comprising:
defining data tracks relative to the servo tracks; and
accessing one of the data tracks while the disk is rotating at the first speed.

22. The method as recited in claim 16, wherein the second speed differs from the first speed by less than ten percent of the first speed.

23. The method as recited in claim 16, wherein the second speed is less than the first speed.

24. The method as recited in claim 16, wherein the second speed is greater than the first speed.

25. The method as recited in claim 16, further comprising adjusting a rotation speed of the disk from the first speed to the second speed in a number of step increments.

26. The method as recited in claim 25, wherein the number of step increments is greater than five.

27. The method as recited in claim 16, further comprising:
disabling the servo control system while adjusting the rotation speed of the disk from the first speed to the second speed; and
after adjusting the rotation speed of the disk, enabling the servo control system and synchronizing to the servo sectors while the disk is rotating at the second speed.

28. The method as recited in claim 16, further comprising processing the second servo samples to measure the frequency response of the servo control system proximate the first servo sample frequency using a signal processing algorithm capable of measuring the frequency response of the servo control system at frequencies higher than half the second servo sample frequency.

29. The method as recited in claim 28, wherein the signal processing algorithm comprises an anti-aliasing multi-rate bode algorithm.

30. The method as recited in claim 28, wherein the signal processing algorithm results in a blind area in the frequency response proximate a servo sample frequency of the disk drive.

* * * * *